United States Patent [19]

Linden

[11] Patent Number: 4,827,425
[45] Date of Patent: May 2, 1989

[54] SYSTEM FOR PERSONALIZATION OF INTEGRATED CIRCUIT MICROCHIP CARDS

[75] Inventor: Lawrence F. Linden, Woodbine, Md.

[73] Assignee: Thorn Emi Malco, Incorporated, Garrison, Md.

[21] Appl. No.: 925,610

[22] Filed: Oct. 31, 1986

[51] Int. Cl.[4] .................... G06F 15/20; G06K 5/00
[52] U.S. Cl. ............................ 364/478; 235/380; 235/492
[58] Field of Search ............... 364/478, 488, 489, 490, 364/491, 468; 235/380, 375, 492, 382; 360/2, 91, 92

[56] References Cited

U.S. PATENT DOCUMENTS

| | | | |
|---|---|---|---|
| 4,387,639 | 6/1983 | Brown et al. | 364/478 |
| 4,511,795 | 4/1985 | Wood et al. | 235/375 |
| 4,585,220 | 4/1986 | Zemke et al. | 364/478 |
| 4,683,372 | 7/1987 | Matsumoto | 235/380 |
| 4,684,791 | 8/1987 | Bito | 235/380 |
| 4,701,600 | 10/1987 | Beech et al. | 235/492 |

Primary Examiner—Joseph Ruggiero
Attorney, Agent, or Firm—Fleit, Jacobson, Cohn & Price

[57] ABSTRACT

A system for personalization of I.C. microchip cards includes a feed mechanism, which feeds blank plastics cards into an encoder, which encodes a magnetic stripe on each card with personalized data from a magnetic tape or disk. Correctly encoded cards are then fed to a personalization module consisting of up to sixty I.C. write stations for programming a microchip of each card with data corresponding to that encoded on the magnetic stripe. The module moves relative to the in-feed and out-feed lines of the cards, at a speed in dependence on the programming time, which can vary depending on the volume and complexity of the program. The magnetically encoded and programmed cards may then optionally be provided with human-readable information by an embosser or printer before being fed out of the system.

9 Claims, 6 Drawing Sheets

SYSTEM FOR PERSONALIZATION OF INTEGRATED CIRCUIT MICROCHIP CARDS

BACKGROUND OF THE INVENTION

1. Field of the Invention

This invention relates to a system for personalization of integrated circuit (I.C.) microchip cards.

Known identification cards include a microchip, the memory of which is programmable with personalized data unique to a particular user of the card, and also a magnetic stripe, which can be encoded with corresponding data. Additionally, the card may also be traditionally embossed or printed with human-readable information.

Commercially and economically viable systems for implementing the personalization of these cards are necessarily required to operate smoothly and continuously to produce an optimum number of personalized cards per unit time.

However, the volume of data to be programmed into the microchip and/or the complexity of the programming required can vary considerably for different cards and consequently the time required to program each microchip can typically vary between 10 and 60 seconds, thereby resulting in irregular flow of cards through the system, thus reducing the card output.

SUMMARY OF THE INVENTION

It is therefore an object of the present invention to provide a system for personalization of I.C. microchip cards, which system is capable of accommodating variable programming times of the microchip without causing unacceptable interruptions in the flow of cards through the system.

According to the present invention there is provided a system for personalization of I.C. microchip cards, said system comprising a plurality of stations arranged in sequence and adapted to receive respective cards and programme the microchips of said cards with personalized data; in-feed means for feeding respective cards to said stations for programming; out-feed means for feeding said programmed cards away from said stations; means for moving said stations relative to said in-feed means and said out-feed means, such that respective ones of said stations in said sequence are successively and repeatedly brought into register with said in-feed means and said out-feed means; means for controlling the speed of said movement between successive registrations of said stations with said in-feed means and said out-feed means, in dependence on the time required for programming said cards; and means for controlling the rate of in-feed of said cards into said stations, in dependence on said speed, to establish a substantially continuous flow of cards through said system.

Preferably, the stations are arranged in a circular formation and the in-feed and out-feed means are arranged relative to the stations so that cards are fed in, and out of, each station radially of the formation.

The formation can then be rotated relative to the in-feed and out-feed means, so that a card is individually fed into a station and another card is fed out of an adjacent station each time the formation is rotated through an angle of 360°/number of stations.

In this way, the stations progressively and simultaneously program the microchips of the cards, as they rotate from the in-feed means to the out-feed means at a rotational speed dependent on the required programming time, so that, when the card is fed out of the station, the programming is complete.

Preferably the cards are fed through an encoder device for encoding a magnetic stripe, provided on the card, with information corresponding to the programmable data, prior to being fed into a station for programming of the microchip.

Additionally, the programmed card can be fed from the station to a device for affixing human-readable information to the card, by, for example, embossing or printing.

The invention will now be further described by way of example only with reference to the accompanying drawings, wherein:

DESCRIPTION OF THE PREFERRED EMBODIMENTS

Figure 1:
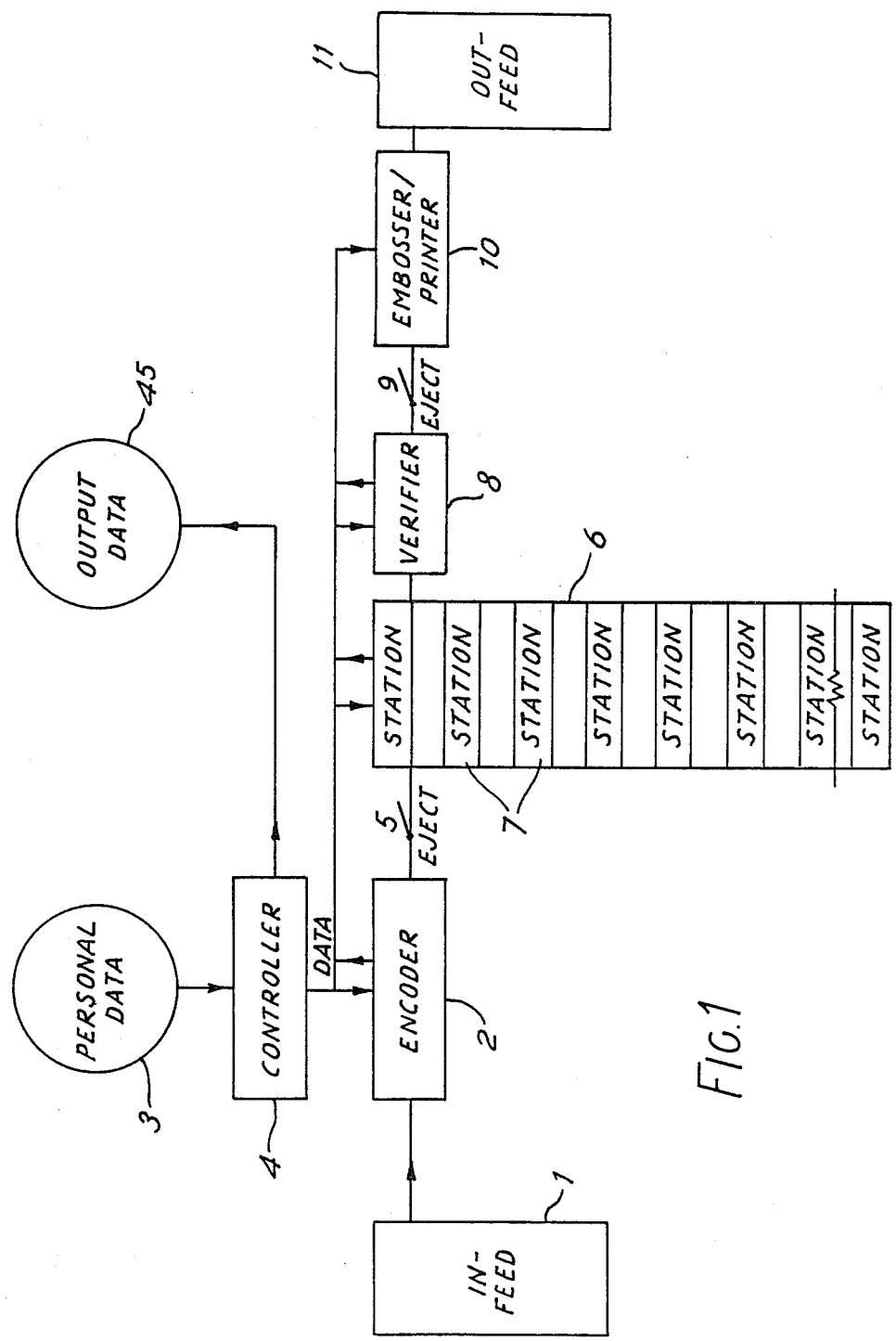
FIG. 1 is a block diagram illustrating the sequence of functions of the system.

A summary of the functions of a system for personalization of I.C. microchip cards is shown in FIG. 1. A feed mechanism 1 feeds plastic cards including a blank magnetic stripe and an magnetic stripe of each card with personalized data from a magnetic or optical tape or disk 3, via a central controller 4. The encoded stripe is then read and ejected at 5, if the encoding is not correct. Correctly encoded cards are then fed to a personalization module 6, consisting of up to sixty I.C. write stations 7 for programming the microchip of the cards with data corresponding to the cardholder whose identification has already been encoded on the magnetic stripe and verifying the accuracy of the personalization data in the microchip. The module moves relative to the in-feed and out-feed lines of the cards, at a speed in dependence on the programming time, as described herein below. When the programming of each card is complete, it is optionally fed to a verifier 8, which verifies that the magnetic encoding and the programming correspond, and any incorrect cards are ejected at 9. The magnetically encoded and programmed cards may then optionally be provided with human-readable information by an embosser or printer 10 before being fed out of the system at 11. As an option, formatted output data 45 may be recorded on magnetic or optical media or a printed copy.

FIGS. 2 to 5 show one construction of a system for implementing the above-described functions.

Figure 2:
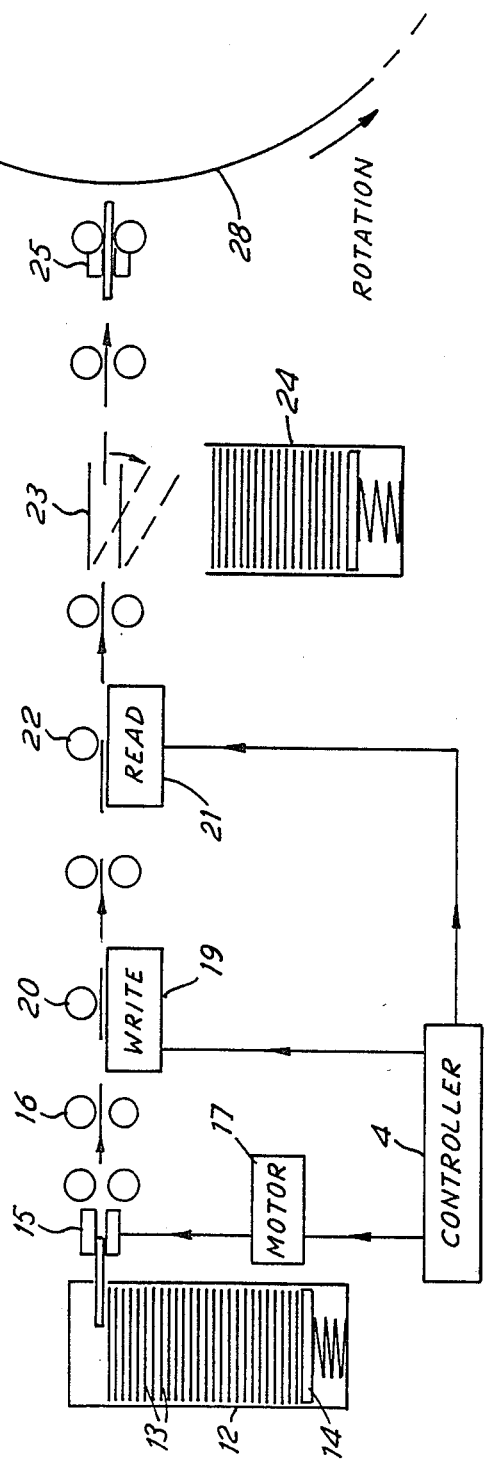
FIG. 2 shows schematically a plan view of the in-feed part of the system prior to the programming.

In FIG. 2, the in-feed part of the system includes a receptacle 12 for retaining blank cards, such as at 13, stacked horizontally and face to face. A spring-loaded sliding pressure bar 14 pushes the stack up to a feed mechanism 15.

The feed mechanism 15 consists of a slider crank mechanism attached to two feed fingers capable of pulling a single card from the stack. The card will then be fed into a series of rotating nip rollers 16. The slider crank mechanism will be driven by a stepped motor 17 programmed for a single revolution when given a signal from a central controller 4. In this way, a single card is fed on demand.

The rollers 16 will be spaced slightly less than a card length apart, and at least one set will be in contact with the card at all times. The nip rollers will be turning constantly and are driven by a series of flat belts and pulleys, (not shown). The main driver will be an independent synchronous motor. The line speed of the card is preferably 15 ips.

A three-track encoder write head 19 mounted on the centerline of one set of nip rollers will encode up to three tracks of personalized information on the magnetic stripe of the card. The information for each card is input to the write head 19 via the central controller 4. A rubber backing roller 20 opposite the write head 19 will apply pressure against the card and write head 19 to insure good contact. A three-track read head 21 with a similar rubber roller 22, will be located on the next set of rollers and will verify that the card has been properly encoded.

Figure 3:
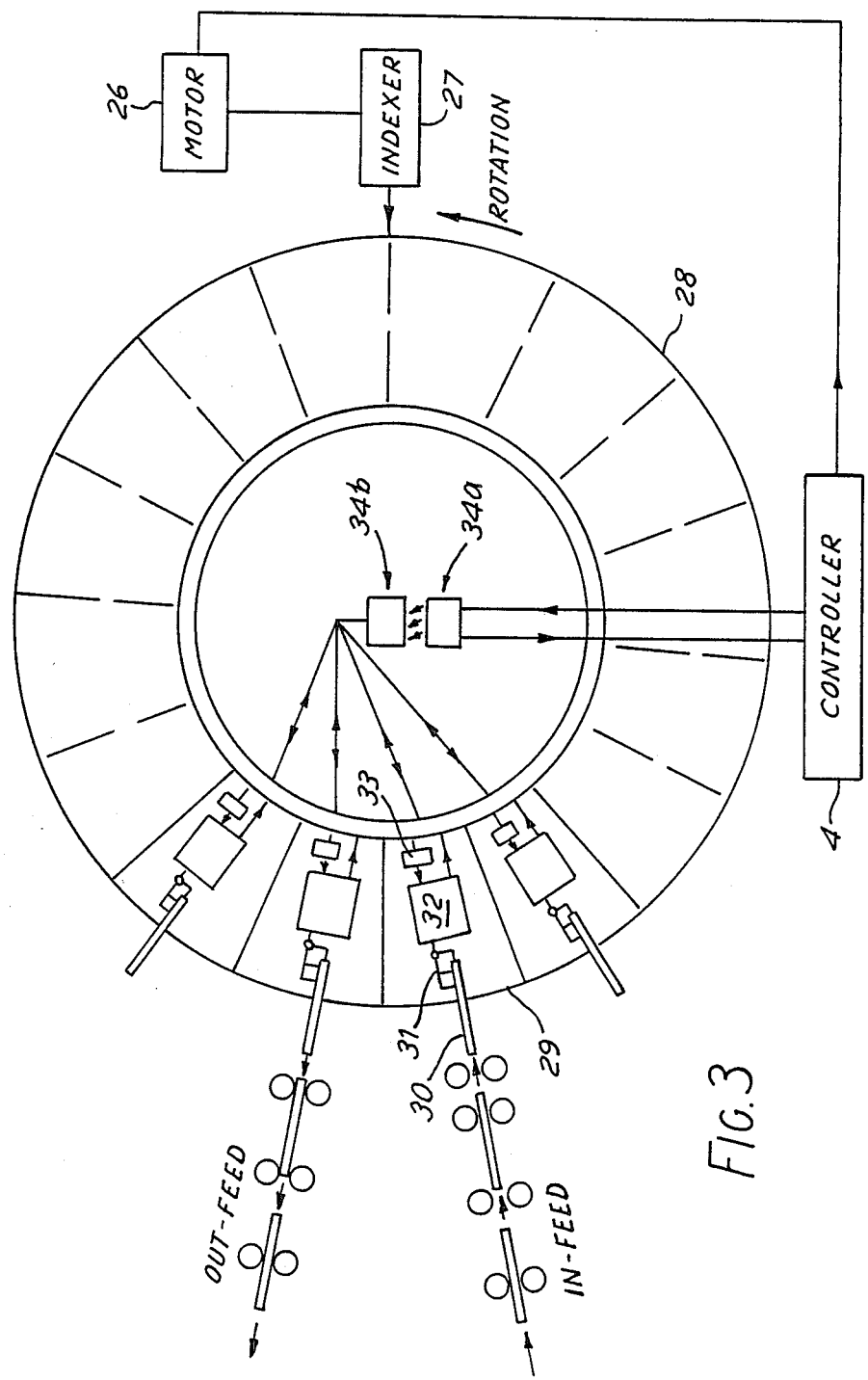
FIG. 3 shows schematically a plan view of a programming module comprising a plurality of programming stations.

A solenoid operated eject gate 23 discharges cards rejected for encoding errors between the read and write head outputs. The rejected cards will be accumulated in a spring loaded discharge receptacle 24 similar to the infeed receptacle 12. The last set of nip rollers will be controlled by a magnetic clutch 25 allowing the card to stop until a rotatable indexing table of a personalization module shown in FIG. 3 is in position to accept the card. The line speed of the last nip roller is preferably 30 ips to ensure a fast insertion into a personalization module, shown in FIGS. 3 and 4.

Figure 4:
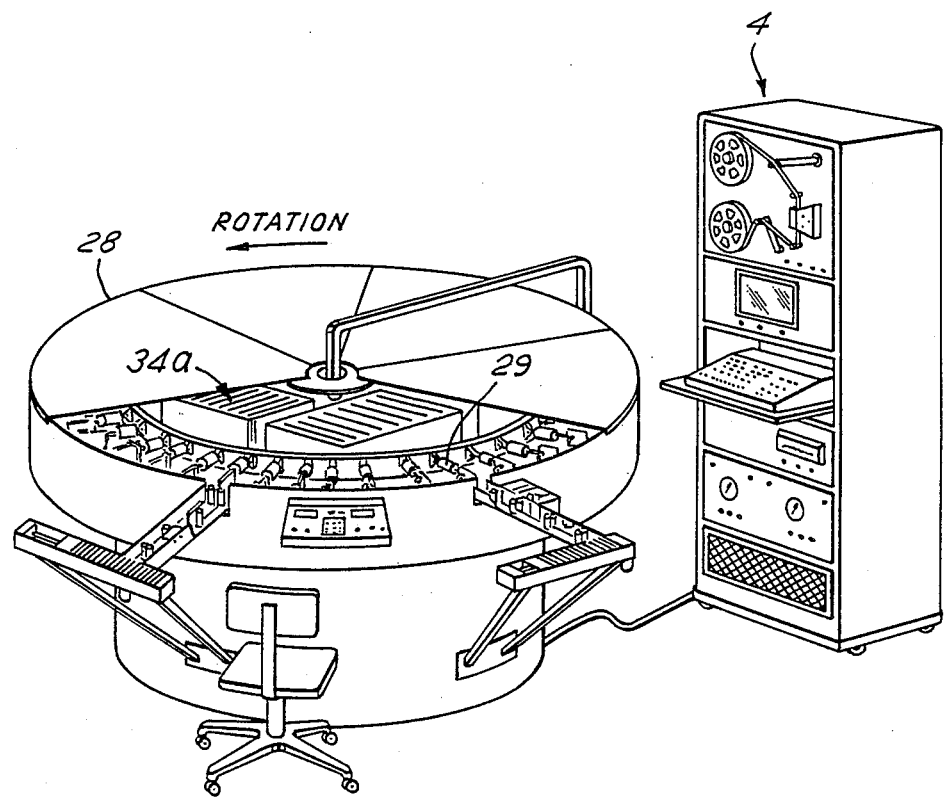
FIG. 4 shows a perspective view of the programming module in FIG. 3.

Referring now to FIGS. 3 and 4, a variable speed D.C. motor 26 will drive a cam driven indexer 27 which in turn will drive a circular table 28. A number, preferably sixty, I.C. read/write stations, each for receiving and programming a card are positioned at equal angular spacing around the periphery of the table 28, all identical to the four stations shown in FIG. 3, such that cards can enter and exit the stations along the radius of the table. The drive motor 26 is preferably geared so that the index angle is equal to 360°/number of stations and the maximum speed is at least one index per second. Approximately 50% of the index cycle is dwell time (ie 0.50 sec.) to allow for the cards to be inserted and extracted from the stations.

Each station, such as 29, has a feed mechanism to clamp and pull a card, such as at 30, into the station. In the same motion, a set of contacts 31 extends and connects to the microchip of the card 30. The same mechanism disengages the contacts and pushes the card out when the card is exited from the station, as described below.

Each station 29 consists of its own microprocessor 32 and buffer 33, connected to a data transfer coupler 34a and 34b in communication with the central controller 4. The coupler may be an optical coupler, or any other appropriate coupler, such as mechanical, serial or parallel.

The microchip in the card 30 can now be programmed with personalized input data delivered to the individual I.C. read/write station 29 from the control unit 18 to match the magnetically encoded information already on the card 29. This information is delivered to the individual I.C. read/write station via an optical coupler 34a, 34b mounted dead center with the rotary table 28. A transmitter receiver 34a suspended over the table delivers the information from the central controller 4 to a transmitter receiver 34b on the table which connects to the I.C. writers. The information is directed to specific I.C. read/write stations via a multi-drop, ethernet or similar protocol. The magnetically encoded microchip card is programmed with the data which corresponds to the same information previously encoded on the magnetic stripe. This I.C. programming typically takes from 10 to 60 seconds depending upon the data volume and complexity of the programming requirement.

The central controller 4 can thus vary the index speed of the table 28, in dependence on the programming required, and thereby effectively control the time interval between the station 29 registering with the in-feed part of the system and the out-feed part respectively, so that the card 30 is fully programmed when it is exited from the station.

A read-after-write function is also performed at the station to verify the accuracy of the personalization data in the microchip. The status of the chip can be communicated to the central controller 4 via the optical coupler 34a and 34b.

Each I.C. read/write station will progressively and simultaneously perform the programming function. The number of work stations is determined by the data content and programming time requirement of a nominal chip so as to achieve the maximum throughput whereby the said throughput is limited only by the maximum magnetic encoding speed.

Figure 5:
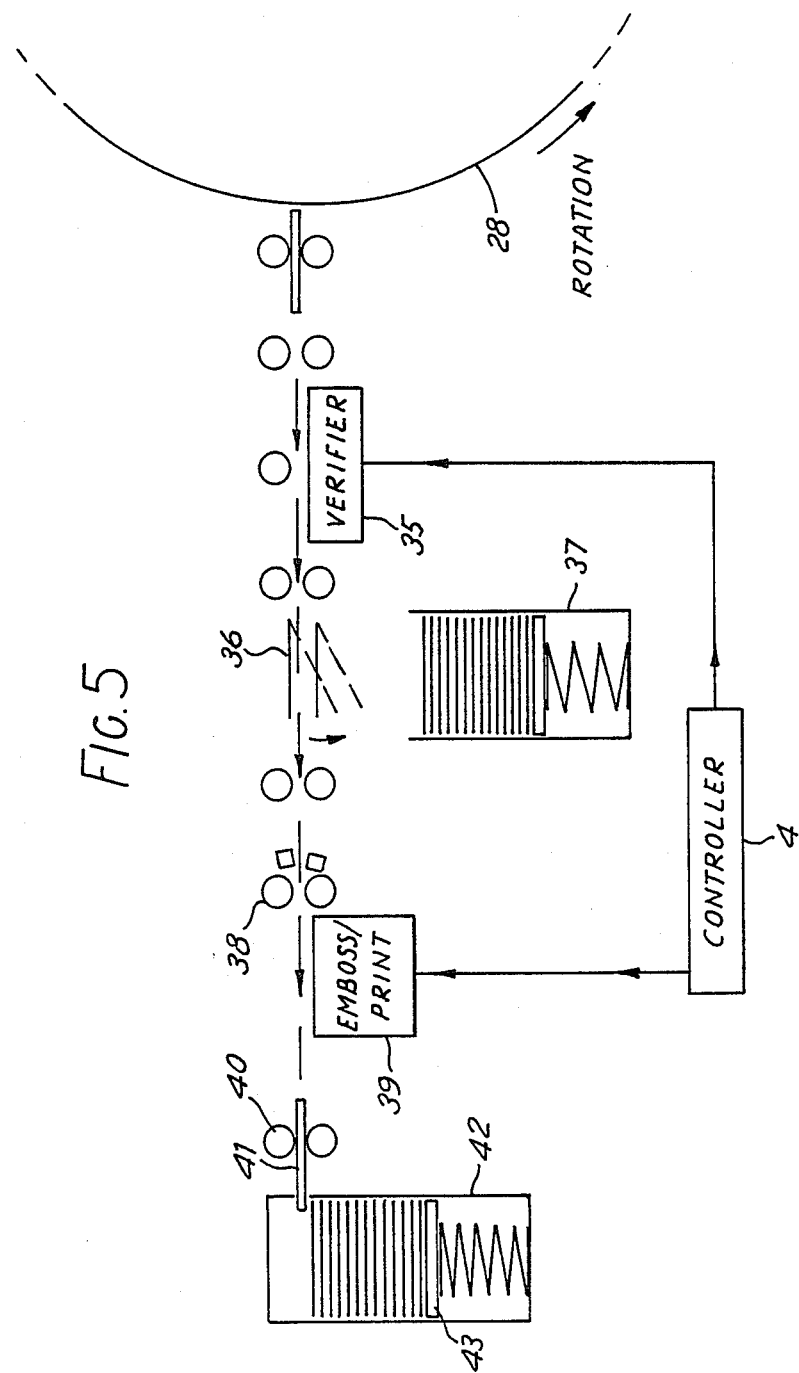
FIG. 5 shows schematically a plan view of the out-feed part of the system after programming.

As shown in FIG. 5, once programming is complete, nip rollers at the out-feed point assist in removal of the card from the station, preferably at a speed of 30 ips. The card is fed to a chip/stripe verifier 35 consisting of a buffer and a magnetic stripe reader to check that the programmed data corresponds to the magnetically encoded data. The card is preferably slowed down to a speed of 15 ips at this stage.

A verification that the correct sequential card was personalized in the chip personalization module is made by storing selected unique data from each chip personalized into the verification buffer. Selected unique data previously encoded on the magnetic stripe of each card is also read by the separate magnetic stripe reader. The selected unique data, such as a primary account number, encoded on the magnetic stripe is compared with selected unique data in the verification buffer for each sequential card processed. The entire device is halted by the central controller 4 if the unique data is not identical between the magnetic stripe and the chip, and an error display is actuated on the central controller unit 4.

Another eject gate 36 is positioned immediately after the verifier 35 to eject incorrect cards into another receptable 37. A clutch controlled nip roller 38 controls feeding of the correct cards into an embosser or printer 39 if human readable information is required to be affixed to the card.

The embossing or printing can be achieved in a number of ways. In the preferred embodiment 3,600 cards/hour are produced, so that the encoded and personalized microchip cards could be fed directly into a 3,600 card/hour embossing machine. However, standard embossers are traditionally limited to 1,800 cards/hour. Therefore, an alternative method is to remove encoded personalized microchip cards from the system and place them in two or more 1,800 cards/hour embossing machines. The secondary embossing machines or units obtain the necessary embossing information from the encoding on the magnetic stripe to complete the embossing of the card. The overall throughput with such secondary embossing machines would be 3,600 cards/hour or greater, based on the number the secondary embossing machines used.

The human readable information may be affixed to the cards by any suitable technique including embossing, ink jet printing, thermal printing, or laser printing, and the card motion in this section will be determined by the chosen technique.

For example, an indexing belt could move a card one character length at a time past a number of daisy wheel type embossers (one for each line of characters). Individual cards will probably be at each of the daisy wheels at any one time with each card at a different stage of embossing.

A continuous roller feed, similar to the encoding operation could be used for ink jet or laser printing.

A set of nip rollers 40 will take a finished card 41 and slide it onto the end of a horizontal stack of cards located in another receptacle 42 similar to the infeed. A spring loaded slide 43 will keep a minimal pressure on the stack to keep the cards orderly.

If no readable information is required on the cards, the embossing/printing stage is not utilised and the encoded and programmed cards are fed straight to the receptacle 30. The receptacle preferably has a capacity of 500 non-embossed or 375 embossed cards.

It can thus be envisaged that in the event that a certain chip architecture may require a greater write/read time than the nominal chip, the index speed of the rotary table can be slowed down allowing more time for programming. The card in-feed will be a demand feed type; thus the rate of card feeding speed will be controlled by the speed of the table so as to provide a constant flow through the device. The I.C. read/write stations are also equipped with replaceable PROM control chips so that different chip card architectures can be accommodated without changing overall control software of the system.

The present system also provides, as an option, a formatted output record which can be on magnetic or optical media (tape or disk), as well as a printed copy. The output record from each magnetically encoded and properly programmed microchip card is obtained by reading the personalized data on each chip and a unique integrated circuit chip identification number contained in the chip fed into a buffer memory under the control of the central controller unit 4. The data is formatted under the control of software in the system. The customer selected output record is then serially written on tape or disk by output hardware. A printed copy of the selected formatted output record can also be optionally printed out by a line printer connected to this device which is similarly managed by the controller unit and the software in the system.

Each card is personalized to a particular customer. If rejected in the personalization process, the customer information is handled differently depending on where the failure occurs.

If a read/write failure occurs the customer information that was to be assigned to that card is simply reassigned to the next card fed into the system.

Should an error occur in the personalization or a mismatch is indicated by the verifier, the associated customer information can be stored in a memory and at the end of a run, all the similarly rejected cards can be rerun together.

If a card is damaged or improperly embossed or printed after the stripe and chip have been personalized, the files are searched for the customer information. Another card can then be run through the system and programmed with the previous card information. All output records are updated to show the change.

The use of a rotary table provides a relatively simple and preferred mechanical handling approach for concurrent personalization of a multiple number of cards.

However, alternative non-rotary constructions could be used, such as a sliding table which can slide back and forth perpendicular to the card flow. The I.C. stations would be mounted side by side and the table would successively position each of them in line with the in-feed and out-feed positions. Another alternative is an indexing conveyor, which could be mounted in line with the card flow, with the overall operation being very similar to that of the rotary table.

Figure 6:
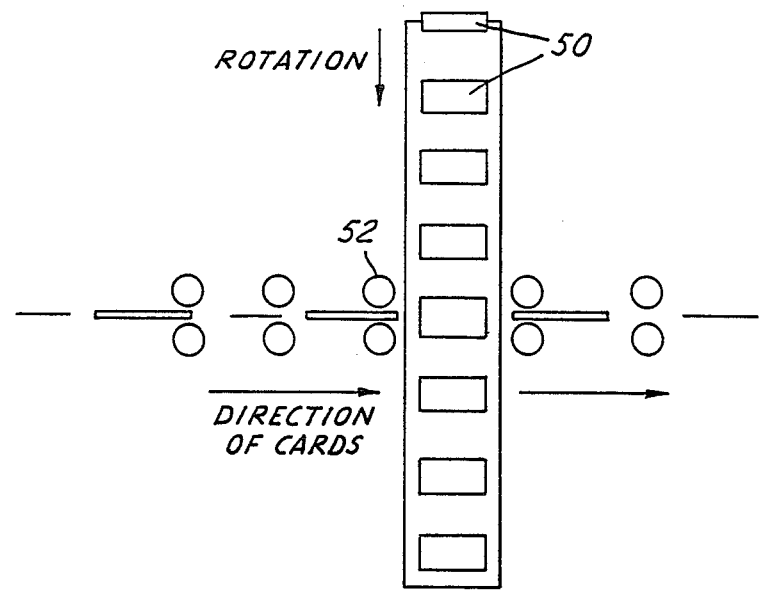
FIG. 6 shows schematically a plan view of an alternative embodiment for the programming module.
Figure 7:
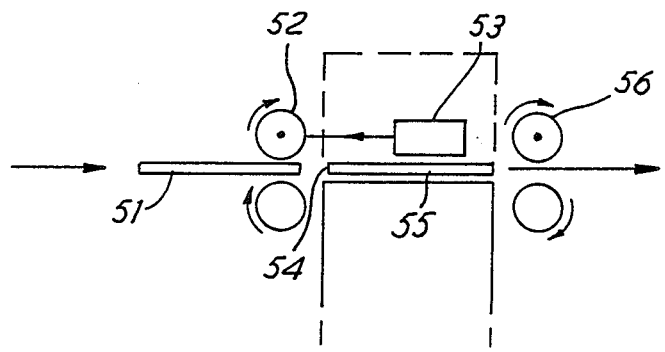
FIG. 7 shows schematically a part of the embodiment shown in FIG. 6 in more detail.

FIGS. 6 and 7 show an alternative embodiment of the personalization module shown in FIGS. 3 and 4.

Referring now to FIGS. 6 and 7, the I.C. read/write stations 50, located in a circular formation, are now disposed in a vertical plane rather than a horizontal plane, as shown in FIGS. 3 and 4, with the direction of the cardflow being perpendicular to the vertical plane of the formation.

As each I.C. station 50 is aligned with the flow of the cards, a card 51 is fed, on demand from the central controller 4, by in-feed rollers 52, simultaneously with the disabling of a write solenoid 53. As card 51 enters a slot 54 in the I.C. station, it pushes card 55, the microchip of which is now programmed by the station, out through out-feed rollers 56, which are continuously rotating.

Once the programmed card 55 is out of the station and card 51 to be programmed is positioned in the station, the write solenoid 53 is re-enabled and the in-feed rollers 51 are disenabled by the central controller 4. This embodiment therefore has the advantage of a combined in-feed and out-feed mechanism, thereby simplifying the system.

The magnetic encoding and optionally the embossing of the cards could be performed in a separate location to the personalization module, and then the magnetically encoded, and optionally, embossed cards could be fed into the personalization module for programming of the microchip of each card, in accordance with the individual data encoded on each magnetic stripe.

I claim:

1. A system for personalization of cards containing integrated circuit microchips, said system comprising:
    a plurality of stations arranged in sequence for receiving input cards having microchips to be programmed and programming means associated with each of said stations for programming the microchips of cards received at the associated station with personalized data;
    in-feed means for conveying input cards to said stations for programing;
    out-feed means for conveying away from said stations programmed cards the microchips on which have been programmed by said programming means;

means for moving said stations relative to said in-feed means and said out-feed means, causing the stations to be successively and repeatedly brought, in accordance with said sequence, into register with said in-feed means and said out-feed means;

means for controlling the speed of relative movement between said stations and said in-feed means and said out-feed means, in dependence on a time period corresponding to that required for programming the microchips on said input cards; and means for controlling the rate of operation of said in-feed means, independence on said speed to establish a substantially continuous flow of cards through said system.

2. A system as claimed in claim 1 wherein said stations are arranged in a circular sequence relative to said in-feed means and said out-feed means, such that the input cards are fed into, and out of, the stations radially of the circle and said stations move relative to said in-feed means and out-feed along a circular track.

3. A system as claimed in claim 2 wherein said stations are positioned at equal angular spacings around the periphery of said formation.

4. A system as claimed in claim 1 and including a device for encoding a magnetic stripe, provided on each card, with information corresponding to the programmable data for said card, said encoding occurring prior to said cards being fed into said stations for programming.

5. A system as claimed in claim 1 and including a device for affixing human-readable information to the cards.

6. A system as claimed in claim 1 and including mans for producing an output record indicative of the personalized data programmed into the microchip of each card.

7. A system as claimed in claim 1 wherein each of said stations includes a replaceable PROM control chip to enable different chip card architectures to be utilised without the necessity of changing overall control software of the system.

8. A system for personalization of cards having an encodable magnetic stripe and an integrated circuit microchip, said system comprising, in combination:

means for encoding the magnetic stripe of each card with personalized data from a data store;

means for programming the microchip of each card with data encoded on said magnetic stripe, said means for programing including card input and output means and a plurality of programming devices and a respective programming station associated with each device, said stations being disposed in an operating sequence;

means for affixing human-readable information onto each of said cards;

guide means for conveying said cards between said encoding means, said card input and output means of said programming means and said information affixing means;

station moving means for moving said programming stations, in said sequence, past the card input and output means at a rate influenced by the time taken for said programming devices to effect the programing of the microchips of said cards; and means for synchronising the rate of conveying of said cards by said guide means to the rate of movement of said stations caused by said station moving means to establish a substantially continuous flow of cards through said system.

9. A system for personalization of cards containing integrated circuit microchips, said system comprising:

a rotary personalization module comprising a plurality of stations arranged in a circular sequence in a plane perpendicular to the flow of said cards through said system for reception of respective cards and each station including programming means for programming the microchips of said cards with personalized data;

a card-feed mechanism for supplying cards to said stations for programming and for conveying programmed cards away from said stations;

means for rotating said module relative to said card-feed mechanism, such that said stations in said sequence are successively and repeatedly brought into register with said card-feed mechanism; and means for controlling the speed of rotation, and thus of successive registrations of said stations with said card-feed mechanism, in dependence on a time period corresponding to that required for said programming means to complete the programming of said cards;

said card-feed mechanism comprising means for feeding card into a station in register with said mechanism, means for enabling said feeding means when programming of the card in said station is complete, so that a programmed card is pushed out of said station by the next card fed into that station, and means for guiding said programmed card away from said station.

* * * * *